United States Patent Office 3,448,002
Patented June 3, 1969

3,448,002
PULPING PROCESS
John R. G. Bryce and Theodor N. Kleinert, Pointe Claire, Quebec, Canada, assignors to Domtar Limited, Montreal, Quebec, and Pulp & Paper Research Institute of Canada, Pointe Claire, Quebec, Canada
Filed June 14, 1965, Ser. No. 463,594
Claims priority, application Canada, June 20, 1964, 905,578
Int. Cl. D21c 3/24, 3/02
U.S. Cl. 162—19                    1 Claim

ABSTRACT OF THE DISCLOSURE

The present invention relates to a method of digesting cellulosic material by impregnating the material with an impregnation liquor to pick up the required amount of chemical for subsequent cooking, separating the material from the impregnation liquor, rapidly heating the impregnated material to cooking temperature and cooking said material in an aqueous heating medium devoid of chemical for replacement of chemical consumed during cooking.

---

Figure 1:
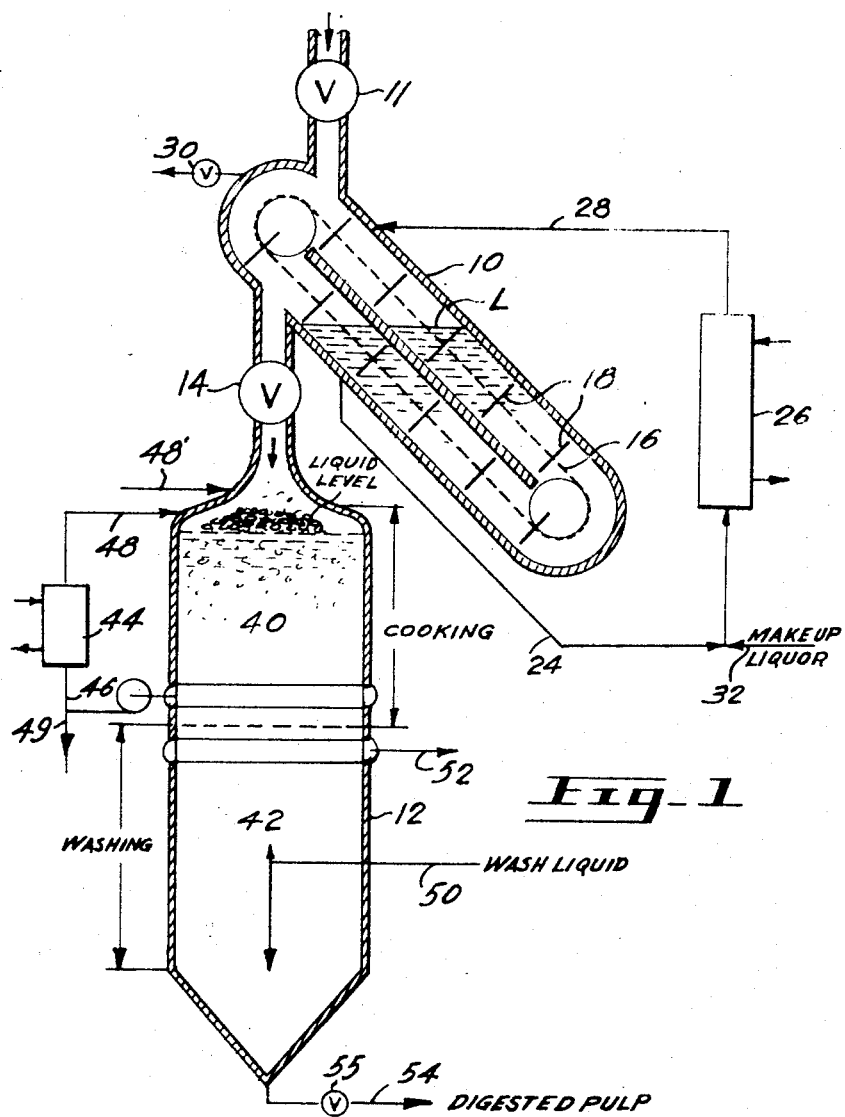

The present invention relates to a system of producing chemical pulps from cellulose-containing materials. More specifically, the present invention contemplates a new system of continuously digesting wood particles such as chips, impregnated with an alkaline digesting chemical, in a liquid medium devoid of any substantial amounts of digesting chemical.

Applicant has found that when wood chips inpregnated with the requisite amount of digesting chemical, are placed in a liquid substantially devoid of cooking chemical and therein maintained at a cooking temperature for sufficient time, pulp is obtained which is comparable with, or better than conventionally produced pulps. It was found, surprisingly that when practicing the present invention, only a very small amount of the chemical carried by the chips was released into, or leached out by, the liquid surrounding the chips during cooking, even though this surrounding liquid had a very low concentration of digestion chemical (in the case of alkaline pulping, about 0.3 to 3.5 grms. per litre effective $Na_2O$). To all appearances, the chips were digested using only the chemical with which they were impregnated. No extra chemical was added during the cooking.

Thus, the liquid surrounding the chips in the cooking zone in the invention plays essentially the role of a heating medium since the minor amount of chemical present in this liquid (which in any case originates from the chemical carried in the chips) would be of too low a concentration to supply the chips with any significant amount of additional chemical during the cooking stage.

Broadly, the present invention includes impregnating cellulose-containing material with a chemical required for cooking and carrying out a major portion of the cooking while such impregnated material is immersed in a liquid medium devoid of any substantial amounts of digesting chemical. The chips are impregnated in a first liquor to absorb the required amount of chemical for subsequent digestion and are then cooked while surrounded by a second liquor which is devoid of, or at a concentration of cooking chemical substantially lower than that used for impregnation.

The method of the present invention will now be described in detail. Cellulose material, for example, wood chips, are pre-steamed and then impregnated, with the required amount of digesting liquor, in an impregnation stage. Care should be taken to ensure that the concentration of the digesting liquor at the impregnation stage be not subject to random variations, e.g., as a result of moisture entering with the chips. The impregnation is carried out by subjecting the cellulose-containing raw material to impregnating liquor under controlled conditions of temperature, pressure, concentration and time. For best results, a high impregnation temperature, preferably between about 100 and 150° C. should be maintained in this stage and also a high liquor to wood ratio should preferably be used. A high liquor to wood ratio permits the use of a relatively low impregnation liquor concentration with a minimum of chemical concentration drop as the liquor is circulated through the chips. The pressure maintained at the impregnation stage may be the vapour pressure at the impregnation temperature selected or in some cases may be higher by a super-imposed hydrostatic pressure. For a required chemical pick-up, the time, the temperature, the chemical concentration and the ratio of liquor to wood must be suitably correlated. Impregnation should be completed in less than 30 minutes, since chemicals are wasted if impregnation time is extended over long periods.

To obtain best results, the temperature for impregnation should be relatively high, but, preferably, should not exceed 150° C. to avoid premature cooking of the wood. On the other hand, with too low an impregnation temperature, diffusion of chemical takes place more slowly and may lead to non-uniform distribution of the chemicals in the wood, a condition which was found to affect adversely the pulping operation. High temperature impregnation has a further advantage in that, generally, the higher the impregnation temperature, the less time required for a given chemical pick-up. The above conditions of impregnation should be so co-ordinated that the amount of chemical picked up by the chips should be of the order of 10–13% $Na_2O$ (based on oven-dry weight of the chips) for producing a bleachable chemical pulp, and a lesser amount for high yield pulps.

After impregnation, the chips proceed into a cooking zone where they are rapidly brought to cooking temperature. The time taken to reach cooking temperature should be as short as possible and in any event should not exceed 30 minutes. The cooking temperature should preferably be as high as possible without detrimentally affecting the quality of the pulp produced. Usually, this temperature will be in the range of 160–195° C. and preferably between 180 and 190° C. Applicant has found that any suitable aqueous heating medium may be used within the cooking zone, as, for example, spent liquor, ordinary water, or any other aqueous liquid medium, provided such medium does not otherwise interfere with the digestion process. Heat may be applied to the heating medium in any suitable manner, including both direct and indirect steaming.

During cooking, as the lignin is solubilized, the wood structure shrinks and liquor is exuded from the chips. This exuded liquor, in which the contained cooking chemicals are largely spent chemically, mixes with the heating medium and thus, for example, in a batch cook, the liquid heating medium will contain some exuded liquor toward the end of the cook. In a continuous system, if the impregnated chips in the cooking zone are initially surrounded with water, the liquor continuously exuded from the chips rapidly displaces the water initially present in the digestion zone. Thus, as the operation continues, the heating medium becomes substantially the exuded liquor and it can be said that the chips are "stewing in their own juice."

Any cooking chemicals contained in the liquor in the cooking zone originate either with the exuded liquor or from leaching of the chips, but in any event, the concentration of such chemicals in the liquor (being in the order of 0.3 to 3 grms. per litre effective $Na_2O$) is too low to supply any driving force for the digestion reactions. Thus, with the present system, it is unnecessary to maintain chemical concentration in the liquid surrounding the chips during cooking. In fact, no chemical whatsoever need be added to the surrounding liquid in the cooking zone to act as a reservoir of chemical in order to replace the chemical being consumed within the chip, as has been heretofore considered essential in liquid phase cooking.

Applicants have found that, in practicing the present invention, the cooking time required will be the range of about 10 minutes to 1 hour. After digestion, the chips preferably pass through a fourth vessel or zone where they are washed and reduced in temperature before being discharged.

With the present invention, the amount of wood plus impregnation chemical entering the cooking zone equals the amount of pulp plus exudate leaving the cooking zone. This pulp and exudate may proceed together to the next stage in the process, or some of the exudate may be separately removed. It is usually preferred to remove as much exudate as possible directly from the cooking zone before it has been diluted by the wash water thereby to reduce evaporation requirements, etc. Generally, the impregnated chips entering the cooking zone carry liquor in the ratio of 1.8 to 2.2 parts by weight to 1 part by weight wood (O.D. basis) while the digested material still in chip form, when leaving the zone holds about 1.2 to 1.6 parts by weight liquor to 1 part by weight of initial wood (oven dry basis).

Further features of the invention will be evident from the following detailed description of several systems of carrying out the present invention as illustrated in the accompanying drawings in which:

FIG. 1 schematically illustrates one form of the present invention.

Figure 2:
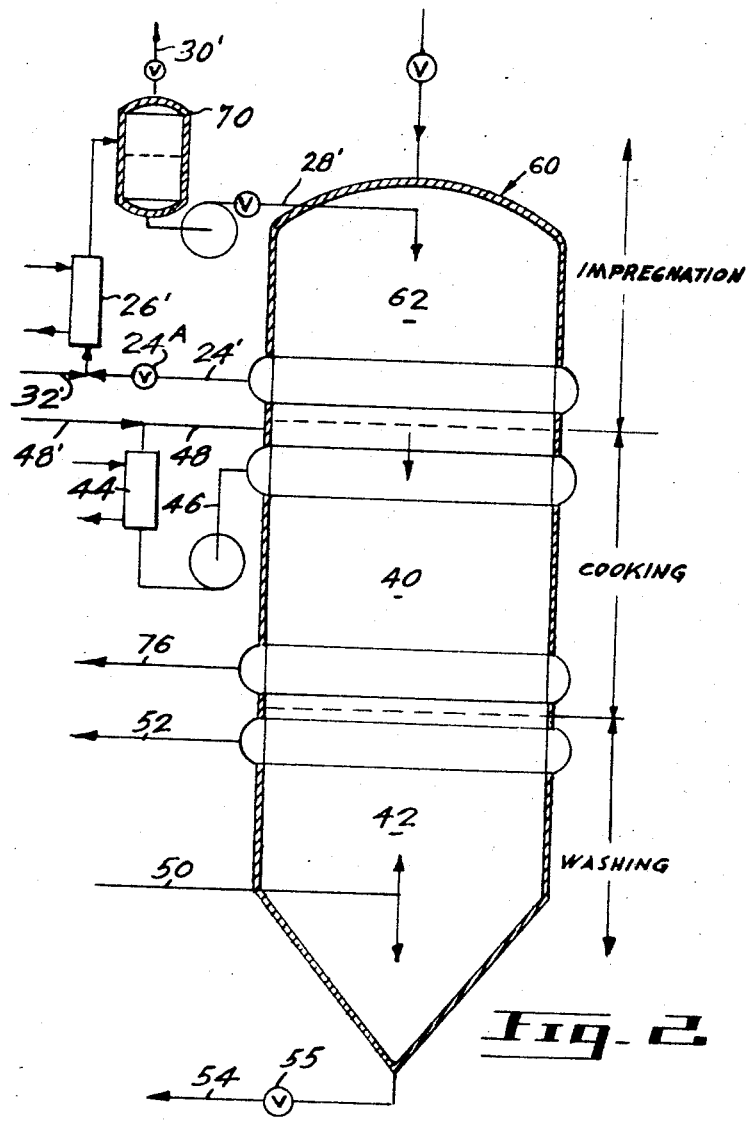

FIG. 2 is a second schematic arrangement incorporating the present invention.

Like reference numerals designate like parts in the various views.

The apparatus of FIG. 1 consists of an impregnation tube 10 connected to a cooking and washing tube 12 through a rotary valve 14 or the like. The impregnation tube shown schematically has a central mid-feather 16 about which a flight-type conveyor passes. Pre-steamed chips enter the tube 10 continuously via the valve 11 and are carried down the top of the mid-feather 16 and then are returned upwardly under the mid-feather to be finally dumped down the passage leading to valve 14.

Control of the chemical to wood ratio is maintained by setting the flow of chips through the valve 11 and make-up liquor in line 32 to give the desired chemical to wood relationship in the pool 20 in tube 10. In order to maintain a water balance in the system liquor is circulated from the pool 20 via line 24 to the heat exchanger 26 where it is heated to a temperature greater than that corresponding to the pressure in the impregnation tube, and then back to the top of the tube 10 via line 28. Excess steam thus flashes in the tube 10 and is removed at control pressure through line 30. A substantially constant liquid level L for pool 20 is held slightly below the outlet of tube 10 by adjusting the temperature of the liquor returning to the tube in accordance with the liquid level L, to increase or decrease the amount of steam removed in line 30 (substantially as described in U.S. Patent No. 3,258,390, George H. Tomlinson II).

Any other suitable means may be used to maintain the water balance in the system. For example, with chips of a low uniform moisture content, such as chips from kiln dried wood, a water balance may be obtained by the addition of the proper amount of water to hold the water balance.

The chips pass continuously through the pool in a suitable pre-determined time controllable by the speed of the conveyor 18 and on leaving the tube 10 are charged with sufficient chemical for subsequent cooking.

Properly impregnated wood chips pass through the valve 14 and enter the cooking vessel 12. Two separate zones, namely, a cooking zone 40 and a washing zone 42 are maintained in this vessel.

The impregnated chips charged with sufficient chemical for cooking, enter the cooking zone 40 of vessel 12 via valve 14. At the top of this cooking zone, the chip level is preferably maintained slightly above the liquid level. Thus, the chips have a short residence time in a steam atmosphere so that the latent heat of this steam may be used in rapidly bringing the chips to digestion temperature as they pass through this section. The length of this steam section is such that the chips passing therethrough reach digestion temperature and then enter the liquid medium where they remain for the major portion of the cook. If desired, the steam atmosphere may be eliminated and the complete cooking zone filled with liquid, however, a longer time will be required to reach cooking temperature and the cooking zone must be extended.

Cooking temperature is maintained in the zone 40 by circulating liquid to a heat exchanger 44 via line 46 and back to the vessel 12 in line 48. The heat applied in the heat exchanger 44 is controlled to maintain the desired digestion temperature in the cooking zone 40, preferably by superheating the liquid in the heat exchanger and flashing it in the upper zone of the digester 12. As above indicated, applicants have found that the liquid heating medium need not contain any added digestion re-agent to aid in chemical digestion.

If desired, heating to digestion temperature may also be by direct steam through line 48' or a combination of direct steam and heat from the heat exchanger 44. The steam in the top of zone 40 condenses on the impregnated chips which are thereby rapidly heated.

Exudate is removed via line 49. Where direct steaming is used, condensed liquid may be removed through the line 49 together with the exudate. Also, if for any reason extra liquid, such as dilute intermediate wash liquid, is added to the cooking zone, this extra liquid could also be removed in line 29. It is possible to permit the liquor from zone 40 to carry down into the wash zone 42 to be withdrawn with the wash liquid, but it is preferable to remove the liquid from zone 40 as above described. Removal of liquid via line 49 provides a relatively sharp transition in the liquids surrounding the chips in solids concentration and in temperature between the cooking zone 40 and washing zone 42.

Cooked chips are washed and cooled in zone 42 by wash liquid entering zone 42 in line 50 and partly flowing in counter-current to the digested material. This counter-current wash liquid, together with that portion of the material washed from the chips by the counter-current wash liquid, is removed through line 52. The remainder of the liquid entering via line 50 leaves the vessel 12 with the pulp through line 54 controlled by valve 55.

Thus, with the above system, the chips leaving the impregnator 10 carry liquor in the ratio of liquor to wood of 1.8 to 2.2 based on the oven dry weight of the wood, while the cooked chips leaving the cooking zone 40 preferably carry about 1.2 to 1.6 parts by weight of liquor to 1 part by weight of the initial wood (oven dry basis).

In the system illustrated in FIG. 2, pre-steamed chips are introduced into the vessel 60 through suitable valve means. These chips pass through the impregnation zone 62 where they become impregnated with the required amount of digesting chemicals substantially as hereinabove indicated. To counteract the variations in the amount of water entering the system at this point, e.g., as moisture in the chips etc., a water balance is maintained in the impregnation zone as hereinbelow described. The impregnated chips are then passed from the impregnation zone to the cooking zone, the chips carrying with them, absorbed or adsorbed, substantially all the liquor needed for cooking. With proper control, substantially no excess liquor, i.e., liquor other than that carried by the chips, or only insignificant amounts of same, is permitted to pass from the impregnation zone to the cooking zone. The cooking zone 40, which functions substantially as described for FIG. 1 but without a steam zone, may be heated in any suitable manner as by heat exchanger 44 or direct steam from line 48′ or a combination of the heat exchanger and direct steam from line 48′. Initially, any suitable aqueous liquors, such as black liquor or water or the like, may be used as a heating medium in the zone 40 but eventually, as cooking and re-cycle of the heating medium continues and exuded liquor accumulates in the heating medium, an equilibrium is established and the composition of the heating medium becomes essentially that of the exuded liquor together with any minor amounts of chemical, leached from the chips in the cooking zone.

As above indicated, this exuded liquor is removed preferably via line 76 before the cooked material enters the washing zone 42.

After the chips have been cooked, the pulp passes into the washing zone 42 where it is washed and cooled as described with reference to FIG. 1. The washed and cooled pulp leaves the vessel 60 via the line 54.

In the impregnation zone 62, a water balance is maintained by withdrawing liquor from the zone 62 via line 24′ and pressure reducing valve 24A, heating the liquor in heat exchanger 26′ and flashing the same in flash tank 70. The required make-up liquor is added from line 32′ to fortify the liquor being circulated. Heat applied in the heat exchanger 26′ is controlled in any suitable manner to obtain the desired amount of flashing in the flash tank 70 and thus maintain a water balance in the system. For example, the total amount of liquid entering and leaving the impregnation zone may be used as a basis for control of the heat exchanger. The level of liquid in tank 70 is controlled in a suitable manner. Processed steam is available from the flash tank 70 at controlled pressure in line 30′ and liquor is pumped back to the impregnation zone 62 from the tank 70 to line 28′.

The embodiment illustrated in FIG. 2 is similar to that of FIG. 1 but utilizes only a single vessel for impregnating, cooking and washing. As shown, the single vessel 60 is divided into three zones, namely, the impregnating zone 62, the cooking zone 40 and the washing zone 42, by circulation of the various liquors concerned.

EXAMPLE 1

In a series of kraft cooks, spruce chips of uniform thickness (4 mm.) were used. The experiments were carried out in a pressure vessel having a steam inlet and a steam outlet, and having further a liquor outlet, and also means and piping for pre-heating pressurized liquor prior to forcing it by hydrostatic pressure into the digester. Relative to the size of the vessel, the liquor inlet and the liquor outlet were dimensioned so as to permit rapid displacement of the kraft liquor used in chip impregnation by an aqueous liquor of lower alkalinity and higher temperature.

Air-dried chips were packed into the pressure vessel in a manner so that the ratio of free space to wood volume was about 5–5.5:1. After sealing the vessel, the chip charge was steamed for 10 minutes at 20 p.s.i. while withdrawing in a controlled manner steam and air through the steam outlet; subsequently, pressurized kraft liquor containing 40 grm./1 litre effective alkali, expressed as $Na_2O$ (sulphidity 30%) and preheated to 150° C. was forced by hydrostatic pressure into the pressure vessel while withdrawing controlled amounts of the liquor through the liquor outlet until the temperature of the chip liquor mixture in the vessel reached about 145° C. which took about three to four minutes; after reaching this temperature, the liquor was kept for 12 minutes in contact with the wood. At the end of this impregnation time, the following experiments were carried out:

(a) At the end of the impregnation time, the liquor in the pressure vessel and washed alkali-free with hot water. aqueous solution of 7.5 gm./litre sodium carbonate preheated to 188–189° C., bringing the digester filling in about three minutes to 183–184° C. After maintaining this temperature for 17 minutes, the cook was quenched by displacing the liquor in the pressure vessel by water of room temperature. Then, the pulp was removed from the pressure vessel and washed alkail-free with hot water. The yield of the pulp was 49.6% and its lignin content 4.9%.

(b) The experiment described under (a) was repeated with the variation that the heating medium during the cooking of the chemical impregnated wood for 17 minutes at 183–184° C. was a mixture of 1:1 of used liquor from experiment (a) and of fresh aqueous solution of 7.5 gm./litre sodium carbonate.

(c) Further, a series of six consecutive cooks similar to the experiment described under (b) was carried out in which used liquor from the preceding cook was used in a ratio of 1:1 with fresh aqueous solution of 7.5 gm./ litre sodium carbonate as heating medium during the cooking of the chemical impregnated wood for 17 minutes at 183–184° C.

In this series, the yield of the washed pulp varied between 49.5% and 50.8% and the pulp lignin content between 4.9% and 5.6%.

No "kraft odour" was observed in the cooks using dilute solutions of sodium carbonate.

EXAMPLE 2

Spruce chips of 27.5% moisture content are fed to a pre-steamer at a rate of 2.5 lbs. per minute. These chips were held at 5 p.s.i.g. for 5 minutes in the pre-steaming.

After steaming, the chips were continuously introduced into an impregnation tube containing re-circulated liquor maintained at 21 grms. per litre effective $Na_2O$ by the addition of make-up liquor in the re-circulating line. The temperature of impregnation was held at 135° C. with a pressure of 35 p.s.i.g. and the chips required 20 minutes to pass through the impregnation zone. A constant level of liquor was maintained in the impregnation tube by superheating re-circulating liquor in a heat exchanger and flashing a variable amount to steam, substantially as described in U.S. Patent No. 3,258,390, George H. Tomlinson II. Make-up liquor, at a concentration of 60 grms. per litre effective alkali and 100% sulphidity, was added to the re-circulating liquor at a rate of 0.6 U.S. g.p.m. The total make-up liquor requirement was 12% based on the oven dry weight of the wood.

Following impregnation, the chips were dropped into a separate cooking vessel which contained a spent liquor (obtained from a previous cook) maintained at a temperature of 185° C. No make-up chemical was added in this vessel and the effective alkali concentration in the liquor was 2 grms. per litre. The chips passed through this vessel in 30 minutes and were removed by means of a rotary valve and allowed to flash to atmosphere. A quantity of liquor, equivalent to the liquor exuded from the chips, was drained from the vessel to maintain a controlled level. No significant odour was observed in the digester area during the course of the cook.

A sample of cooked pulps taken during this experiment, had the following properties:

Chlorine No. 4.9.
C.E.D. viscosity 23.8 C.P. at 0.5%.
Screen rejects 1.31%.

After heating to 450 Canadian Standard Freeness in a Valley Beater, the pulp showed the following strength characteristics:

| | |
|---|---|
| Beating time _____minutes__ | 45 |
| Bulk _____ccs. per gram__ | 1.32 |
| Tensile breaking length _____k.m__ | 13.7 |
| TAPPI burst factor _____ | 98 |
| TAPPI tear factor _____ | 94 |
| Burst+½ tear _____ | 145 |

EXAMPLE 3

4,500 grms. of spruce chips having a moisture content of 14.3% were placed in a 2 cu. ft. pressure vessel and steamed for 20 minutes at atmospheric pressure. At the end of this time, the vessel was filled with a liquor having a temperature of 130° C. and consisting essentially of a solution of sodium sulfide (i.e. having a CPPA sulfidity of 100%) and having a concentration of 35.3 g./l. This liquor was circulated in the digester in contact with the chips for a period of 20 minutes, maintaining the above temperature and at the vapour pressure of the liquor (25 p.s.i.g.). At the end of this time, all the free liquor was withdrawn from the digester. The concentration of the withdrawn liquor was 25.3 g./l., and (by difference) the alkali remaining in the chips amounted to 11.9% effective alkali as $Na_2O$, based on the oven dry weight of the wood.

Immediately following the withdrawal of the impregnation liquor, the digester was filled with water to give a liquor to wood ratio of 4.6:1. This water had been heated to a temperature of 186° C. prior to addition to the digester. The time of addition was 3 minutes and the temperature in the digester maintained by direct addition of steam. The water was circulated in the digester and the temperature was maintained at 186° C. for a period of 45 minutes. The concentration of alkali in this water rose to 1.0 g./l., immediately after addition to the digester, and was 0 g./l. at the end of the digestion period.

At the end of this time, the pressure was rapidly reduced to atmospheric, the chips removed from the digester, disintegrated, washed, and screened and the yield of accepted and rejected pulp determined. The pulp showed the following characteristics:

| | | |
|---|---|---|
| Yield: | | |
| Accepted _____percent__ | | 44.8 |
| Rejected _____do____ | | 0.4 |
| Total _____do____ | | 45.2 |
| Kappa No. _____ | | 31.7 |
| C.E.D. viscosity _____ | | 44.8 |
| TAPPI brightness _____ | | 31.7 |
| Properties at 450 Canadian Standard Freeness: | | |
| Beating time _____min__ | | 50 |
| Bulk _____cc./gm__ | | 1.34 |
| Burst _____ | | 129 |
| Tear _____ | | 100 |
| Tensile _____ | | 15.9 |
| Fold _____ | | 3,510 |

We claim:

1. A method of digesting cellulosic material comprising: impregnating said cellulosic material in an impregnation zone wherein said cellulosic material is immersed in an alkaline impregnation liquor whereby said cellulosic material is surrounded by said alkaline impregnation liquor and picks up the required amount of chemical for subsequent cooking, separating impregnated cellulosic material containing therein sufficient chemical for subsequent digestion from said impregnation liquor surrounding said cellulosic material and introducing said impregnated cellulosic material substantially free of excess impregnation liquor into a cooking zone containing an aqueous liquid heating medium, rapidly heating said impregnated cellulosic material to cooking temperature in a vapour atmosphere and cooking said material in said aqueous liquid heating medium, said aqueous liquid heating medium having a chemical concentration too low to drive chemical into said cellulosic material for replacement of chemical consumed during cooking, said concentration being at most equal to that of liquor leached and exuded from said material during cooking.

References Cited

UNITED STATES PATENTS 3,035,963    5/1962    Schnyder _____ 162—19

HOWARD R. CAINE, *Primary Examiner.*

U.S. Cl. X.R.

162—43, 60, 68